United States Patent Office 3,195,952
Patented July 20, 1965

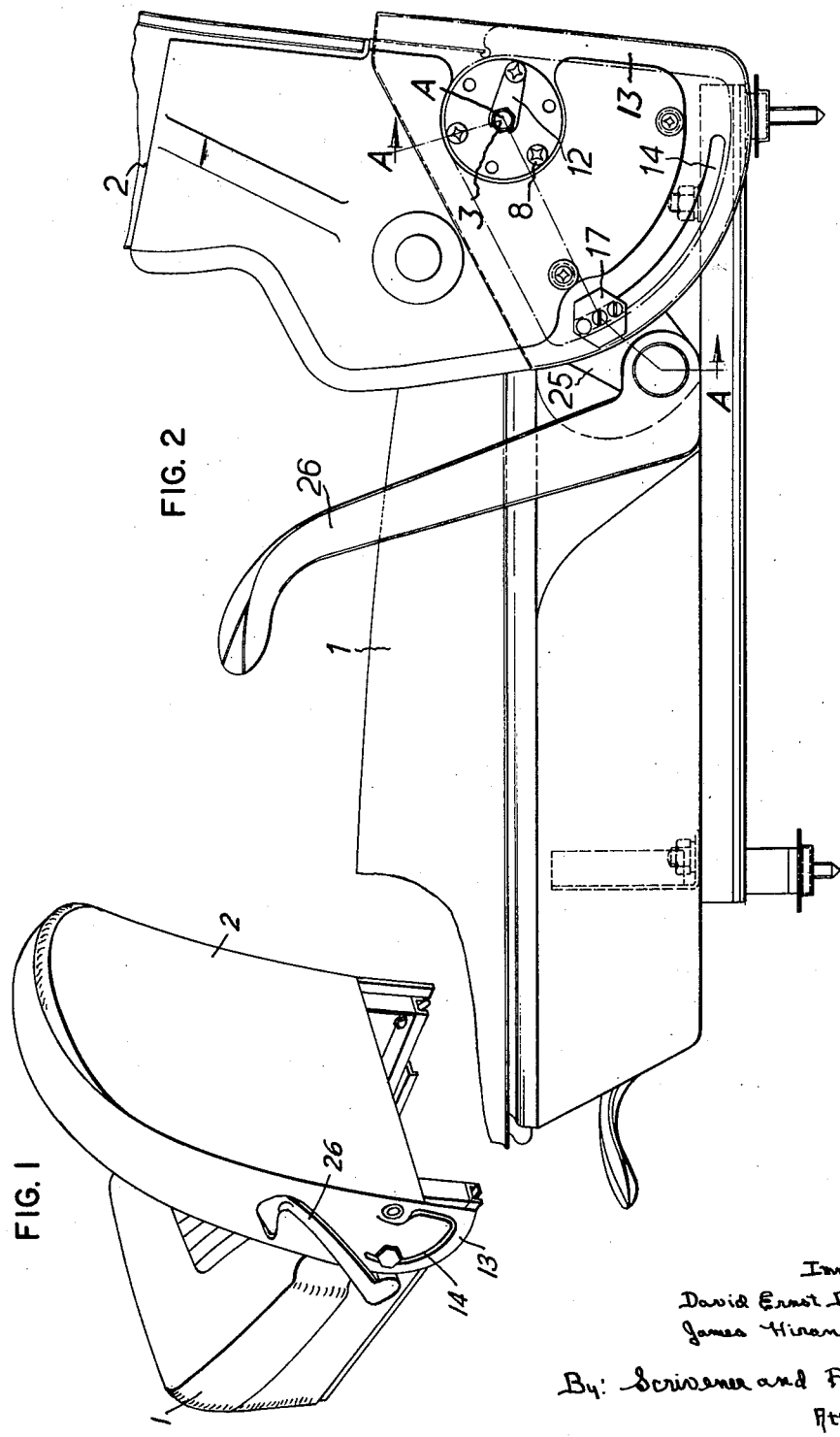

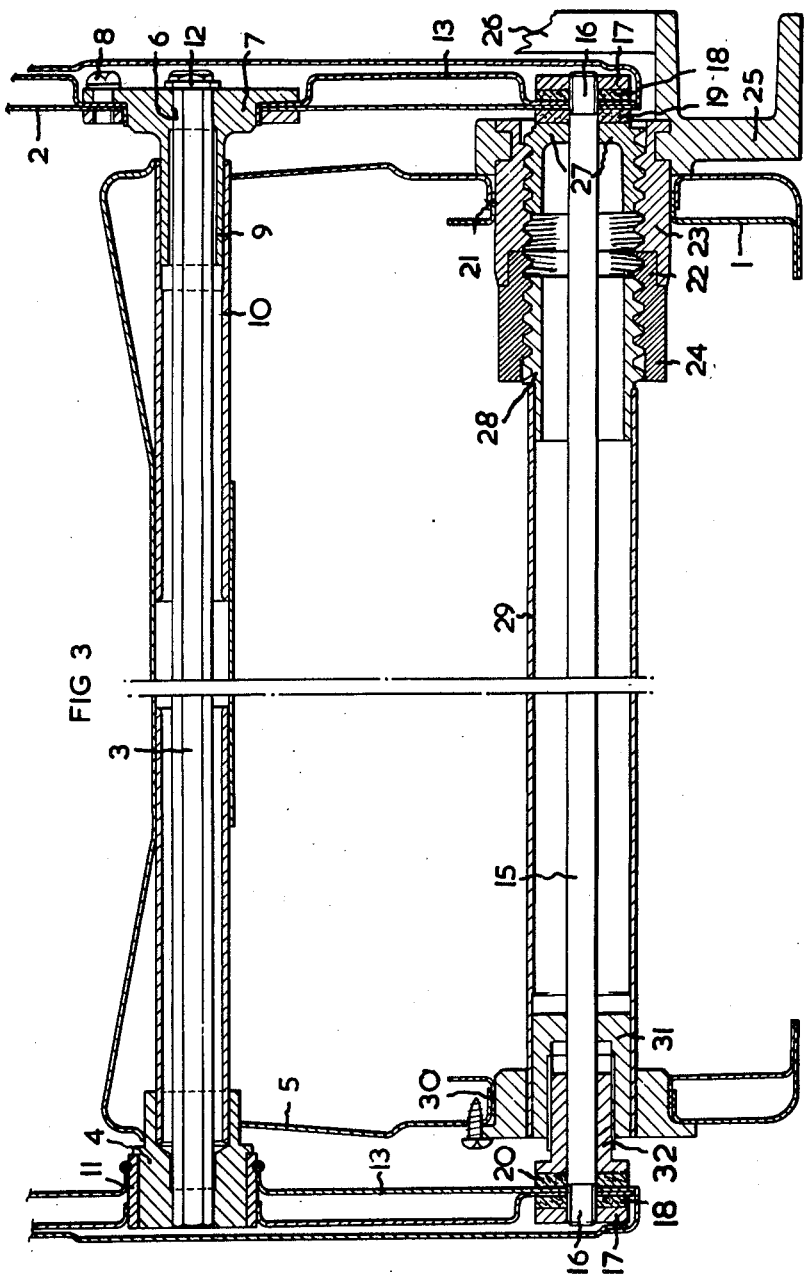

3,195,952
SEAT WITH ADJUSTABLE INCLINATION BACK
David E. Bache, Dorridge, and James Hirons, Wood End, England, assignors to The Rover Company Limited, Warwickshire, England, a British company
Filed July 22, 1963, Ser. No. 296,507
Claims priority, application Great Britain, July 25, 1962, 26,617/62
9 Claims. (Cl. 297—374)

This invention relates to seats having backs of which the inclination is adjustable. The invention is particularly applicable to the front seats of a passenger motor car, but may be applied to any adjustable-back seat, not necessarily in a vehicle at all.

The usual arrangements for adjusting the inclination of the back of a vehicle seat involve the back being pivoted at its two lower corners to the rear corners of the base of the seat, and a mechanism is arranged to lock the pivot on one side, for example by means of a manually released detent guided in the base of the seat and engaging in any one of a number of teeth on a quadrant secured to the seat back. A spiral spring provides a balancing force to oppose the force of gravity as the seat back tilts. However, such an arrangement only gives a limited number of possible angular positions for the seat back and furthermore the action of locking the hinge on only one side can lead to substantial distorting forces being applied to the back.

There have been proposals involving the use of toothed gearing, for example worm gearing, and these allow adjustment to any position within a range, but the time taken for adjustment is long, and the seat back cannot, for example, be rapidly shifted from an upright to a fully reclining position.

It is an aim of the present invention to provide an improved arrangement for adjusting the rake of the back of a seat, in particular an arrangement allowing infinite adjustment combined with ease and rapidity of adjustment.

Another aim of the invention is to provide an adjusting mechanism which is largely concealed and which avoids the use of unsightly spring housings or toothed members in the region of the pivotal axis of the seat back.

According to the invention the relative angular position of the base of a seat and of the back which is hinged to the base is controlled by a sector secured to or forming part of one of these two members and engaged over a limited arc between friction pads or surfaces mounted on the other member at a point displaced from the axis of the hinge, the grip of the pads or surfaces on the sector being capable of application and release by manually operable means such as a lever.

Preferably the sector is on the seat back and the pads or other friction surfaces are mounted on the base. The manually operable control means can then conveniently be a lever pivoted to the base under or alongside the seat cushion and extending forwards for easy access by the user.

Preferably also there is not just one sector but a pair, one each side of the seat, so that no wracking strains are applied to the seat back, and the friction pads or surfaces engaging the two sectors are actuated simultaneously by a common lever.

The friction pads or surfaces, being displaced from the axis of the hinge, are preferably disposed forward of the hinge so that their actuating means can be incorporated in the base of the seat. A further advantage of this arrangement is that the actuating lever can be conveniently positioned for grasping by the user without being excessively long, as would be the case with a lever having its pivotal axis coincident with the axis of the hinge.

Instead of a bulky spiral spring to balance the weight of the back we prefer, according to a further feature of the invention, to use a torsion bar extending in a direction parallel to the axis of hinging, in fact the torsion bar can actually lie on this axis, with one end secured to the seat back at one hinge, and the other end secured to the base of the seat at the other hinge. An advantage of the use of a torsion bar on the axis of the hinge is that it eliminates the necessity for the bulky spiral clock-springs usually requiring to be housed on each side of the seat.

The invention will now be described by way of example with reference to the accompanying drawings, in which:

FIGURE 1 is a perspective view of a seat embodying the invention;

FIGURE 2 is a side elevation of the lower rear part of the seat, looking from the left-hand side of the seat;

FIGURE 3 is a cross-section through the lower rear part of the seat on the line A—A in FIGURE 2.

The seat illustrated is designed as the right-hand front seat of a sedan automobile and comprises a base 1 and a back 2 which can be adjusted from the upright position illustrated to a fully reclined position where the back is almost in the plane of the base 1. The back is hinged to the base and a torsion bar 3 is arranged to provide a balancing force which increases with the angle of tilt of the angle of tilt of the back as will now be described. One end of the torsion bar (which is, for example, hexagonal in cross-section) is gripped on a bushing 4 carried in a frame member 5 of the seat base 1, the other end of the torsion bar co-operating with a mating hole 6 in a bushing 7 secured to the back as by bolts 8. The bushing 7 is formed with a cylindrical portion 9 extending co-axially with the torsion bar and this porton 9 is journalled in a sleeve 10 mounted in the base, forming a hinged connection from the back to the base at this side of the seat. The other hinged connection is formed by a sleeve 1 secured to the back and adapted to turn on the bushing 4. The torsion bar is located axially by means of a slotted retaining plate 12 secured to the bushing 7 by one of the bolts 8 and engaging an annular groove in the end of the bar 3. Tilting of the back 2 causes elastic torsional distortion of the bar 3 which produces a force to balance the force of gravity. To pre-set the loading of the torsion bar 3 the plate 12 is released and the bar 3 is moved axially until one end is clear of its associated bushing. This end can then be turned through the required angle and the bar can be moved back to its operative position and be locked by the plate 12. In this way the angular position of the back corresponding to the unstressed condition of the torsion bar may be varied.

Each side of the back carries a sheet metal sector 13 centred on the axis of the torsion bar 3 and lying in a plane normal thereto. Each sector is formed with an arcuate slot 14 through which extends one end of a tension rod 15 which is disposed in the frame of the seat forward of and a little below the axis of the bar 3. The ends of the tension rod are screw threaded as at 16 and engaged by backing plates 17 holding pads 18 of frictional material in contact with limited arcs of the outer surfaces of the sectors 13. Further pads 19 and 20 coaxial with and free to slide on the tension rod 15 are disposed in close proximity to the inner faces of the right-hand and left-hand sectors respectively and are arranged to be applied thereto as will now be described.

Journalled in a bore 21 in the base 1 coaxial with the rod 15 is a sleeve 22 formed in two portions 23, 24 on which are formed respectively internal left-hand and right-hand screw threads. A bracket 25 is secured to the sleeve 22 and carries a hand lever 26 extending alongside the seat. The left-handed thread on the sleeve 22 is engaged by a screwed plug 27 which carries the pad 19 and the right-handed thread is engaged by a screwed plug 28 to which is secured one end of a tube 29. The other end of the tube 29 is received in a bearing 30 carried in the base 1 and is closed by a plug 31 in screw threaded engagement with a screwed sleeve 32 on which is carried the pad 20. By rotating the sleeve 32 the positions of both pads 19 and 20 may be adjusted relative to the sectors 13.

Angular movement of the sleeve 22 caused by downward displacement of the lever 26 urges the plugs 27 and 28 apart pressing the inner pads 19 and 20 against the inside faces of the sectors 13 and the resultant very slight deflection of the sectors 13 themselves causes the pads 18 to press against the outer faces of the sectors. The sectors are thus securely gripped between the pairs of pads locking the back in position. To adjust the tilt of the back the user has only to pull the lever 26 upwards to disengage the pads, move the back to the desired position and push the lever down again.

If necessary the lever may be urged by a further torsion bar or by other resilient means into its locking position. The rubbing faces of the sectors and pads may be nickel-plated to reduce wear.

Provision may be made for initial adjustment on setting up or for taking up wear, and this could for example be done by making one of the outer pads have a screwed engagement with the tension rod, but it is most conveniently achieved in the manner illustrated by giving that inner pad 20 which is mounted on the tube 29 a screwed engagement with the tube.

The arrangement described not only gives the advantage of an infinitely variable adjustment, and one which is easily operable, but also has a useful safety feature, namely, that in the event of the vehicle coming to a sudden halt or being struck from the rear, the seat back will only offer limited resistance to impact with a body such as a passenger, and will yield under the blow, absorbing its energy in slipping at the pads, thereby avoiding injury to the passenger and also avoiding damage to the seat back.

The disposition of the friction pads 18, 19 and 20 and their actuating mechanism forward of the axis about which the back hinges, and the application of the pads to only a limited arc of the sectors leaves the hinges free of unsightly or bulky mechanism and furthermore allows the mechanism to be largely concealed beneath the seat. It also allows the lever 26 to be placed where it is easily accessible to the user without being unduly long.

We claim:

1. A seat comprising a seat frame, a seat back hingedly connected thereto about a horizontal axis substantially at the rear edge thereof, first and second sectors secured to the seat back at laterally opposite sides thereof and centred on said axis, first and second frictional gripping means respectively disposed on laterally opposite sides of said seat frame, said gripping means being disposed in a co-operating relationship with said sectors respectively to be capable of gripping said sectors over limited arcuate portions thereof in regions displaced from said axis, manually operable lever means mounted on said seat frame for pivotal movement, and an operative connection between said lever means and said first and second frictional gripping means, said lever means being movable between a position in which said gripping means grip their associated sectors and a position in which sectors are released.

2. A seat as set forth in claim 1 wherein said frictional gripping means each comprise a pair of surfaces disposed on opposite sides of the associated sector and adapted to be urged toward each other by movement of said lever means to the first-mentioned position to grip the sector between them.

3. A seat as set forth in claim 2 wherein said operative connection comprises a sleeve secured to said lever means for angular movement therewith, said sleeve being provided with left-hand and right-hand screw threads, and first and second force-transmitting members having threaded engagement with said left and right hand threads respectively and acting respectively on said first and second frictional gripping means.

4. A seat as set forth in claim 3 including a torsion bar extending substantially along said axis, one end of said torsion bar being secured to the seat frame and the other end of said torsion bar being secured to the seat back.

5. A seat comprising a seat frame, a seat back hinged thereto about a horizontal axis which extends transversely across the rear edge of said seat frame, first and second sectors secured to said seat back on laterally opposite sides thereof and centered on said axis, first inner and outer frictional gripping surfaces, said surfaces being disposed on opposite sides of said first sector to grip said sector between them over a limited arcuate portion thereof, second inner and outer frictional gripping surfaces, said second surfaces being disposed on opposite sides of said second sector to grip said second sector between them over a limited arcuate portion thereof, all of said surfaces being displaced from said axis, a rigid inextensible connection between said first and second outer gripping surfaces, a connection of variable length between said inner gripping surfaces, and manually operable means for expanding said variable-length connection.

6. A seat comprising a seat frame, a seat back hingedly connected thereto about a horizontal axis substantially at the rear edge thereof, first and second sectors secured to the seat back at first and second lateral side edges thereof respectively, said sectors each having inner and outer faces, first, second, third and fourth friction surfaces associated with said seat frame, said first and second surfaces being in engagement with the outer and inner faces respectively of said first sector, and said third and fourth surfaces being in engagement with the inner and outer faces respectively of said second sector, inextensible means interconnecting said first and fourth surfaces, expansible means interconnecting said second and third surfaces, and manually operable actuating means connected to said expansible interconnecting means and capable, on actuation, of expanding said interconnecting means.

7. A seat comprising a seat frame, a seat back hingedly connected thereto about a horizontal axis substantially at the rear edge thereof, first and second sectors secured to the seat back at first and second lateral sides edges thereof respectively, said sectors each having inner and outer faces over regions displaced from said axis, their respective inner faces being directed towards each other, first, second, third and fourth friction surfaces associated with said seat frame, said first and second surfaces being in engagement with the outer and inner faces respectively of said first sector, said third and fourth surfaces being in engagement with the inner and outer faces respectively of said second sector, inextensible means interconnecting said first and fourth surfaces, a sleeve having two screw threads of opposite hand, a first connecting member extending between said second friction surface and said sleeve and having a threaded engagement with one of said threads, a second connecting member extending between said sleeve and said third friction surface and having a threaded engagement with the other of said threads, and manual lever means associated with said sleeve and adapted to cause angular movement thereof.

8. A seat as set forth in claim 7 wherein said manual lever means extend in a generally forward direction along one side of said seat frame.

9. A seat comprising a seat frame, a seat back hingedly connected thereto about a horizontal axis, a torsion bar extending along said axis across substantially the width of said frame and said back and having first and second ends, a non-rotatable connection between said first end of said torsion bar and said seat back, a non-rotatable connection between said second end of said torsion bar and said seat frame, first and second sectors secured to said seat back at opposite lateral side edges thereof, first, second, third and fourth friction surfaces mounted on said seat base, said first and second surfaces engaging opposite faces of said first sector over limited arcuate regions thereof displaced from said axis and said third and fourth surfaces engaging opposite faces of said second sector over limited arcuate regions displaced from the axis thereof, and single manually operable lever actuating means capable of forcing said first and second surfaces towards each other and said third and fourth surfaces towards each other simultaneously.

References Cited by the Examiner

UNITED STATES PATENTS

| 281,038 | 7/83 | Eichelberger | 297—268 |
| 2,290,672 | 7/42 | Cantor | 297—374 |

FRANK B. SHERRY, *Primary Examiner.*